(12) United States Patent
Andersson et al.

(10) Patent No.: US 7,023,846 B1
(45) Date of Patent: Apr. 4, 2006

(54) SYSTEM, DEVICE, AND METHOD FOR ESTABLISHING AND REMOVING A LABEL SWITCHED PATH IN A COMMUNICATION NETWORK

(75) Inventors: Loa Andersson, Alvsjo (SE); Tove Madsen, Trangsund (SE); Kenneth Sundell, Skarpnack (SE)

(73) Assignee: Nortel Networks Limited, (CA)

( * ) Notice: Subject to any disclaimer, the term of this patent is extended or adjusted under 35 U.S.C. 154(b) by 660 days.

(21) Appl. No.: 09/618,530

(22) Filed: Jul. 18, 2000

(51) Int. Cl.
H04L 12/28 (2006.01)

(52) U.S. Cl. ............... 370/389; 370/397; 370/399; 370/395.5

(58) Field of Classification Search .......... 370/229, 370/230, 231, 235, 351, 389, 392, 395.1, 370/396, 397, 398, 399, 395.5–395.52, 400, 370/401, 465–467
See application file for complete search history.

(56) References Cited

U.S. PATENT DOCUMENTS

| | | | | |
|---|---|---|---|---|
| 5,822,319 | A * | 10/1998 | Nagami et al. | 370/392 |
| 5,892,924 | A * | 4/1999 | Lyon et al. | 709/245 |
| 5,903,559 | A * | 5/1999 | Acharya et al. | 370/355 |
| 5,917,820 | A * | 6/1999 | Rekhter | 370/392 |
| 5,991,300 | A * | 11/1999 | Tappan | 370/392 |
| 6,188,689 | B1 * | 2/2001 | Katsube et al. | 370/389 |
| 6,339,595 | B1 * | 1/2002 | Rekhter et al. | 370/392 |
| 6,408,001 | B1 * | 6/2002 | Chuah et al. | 370/392 |
| 6,430,155 | B1 * | 8/2002 | Davie et al. | 370/232 |
| 6,466,985 | B1 * | 10/2002 | Goyal et al. | 709/238 |

OTHER PUBLICATIONS

Viswanathan et al, Evolution of Multiprotocol Label Switching, IEEE, pp. 165-173, May 1998.*
Ryan, Multiprotocol Label Switching (MPLS), Technology Guide, pp. 1-49, 1998.*
Boustead et al, Label Switching and IP Version 6, IEEE, pp. 561-565, 1998.*
Nagami et al, Flow Aggregated, Traffic Down Label Mapping in Label-Switching Networks, IEEE, pp. 1170-1177, 1999.*
Chen et al, Reliable Services in MPLS, IEEE, pp. 58-62, 1999.*

(Continued)

Primary Examiner—Frank Duong
(74) Attorney, Agent, or Firm—McGuiness & Manaras LLP

(57) ABSTRACT

A system, device, and method for establishing and removing a label switched path in a communication network uses a packet-driven mechanism rather than using an explicit signaling protocol to exchange label switching information from an upstream label switching device to a downstream label switching device. In order to establish a label switched path from the upstream label switching device to the downstream label switching device, the upstream label switching device allocates a new label for the label switched path, sets up the label switched path by adding the new label to its forwarding table, and forwards a labeled packet including the new label and an indicator indicating that the packet is labeled. Upon receiving the labeled packet from the upstream label switching device, the downstream label switching device sets up the label switched path by adding the new label to its forwarding table, and forwards the packet based upon network layer addressing information in the packet. In order to remove the label switched path, the upstream label switching device forwards unlabeled packets to the downstream label switching device, and both devices remove the label from its respective forwarding table.

47 Claims, 13 Drawing Sheets

OTHER PUBLICATIONS

Armitage et al, MPLS: The Magic Behind the Myths, IEEE, pp. 124-131, 2000.*

Callon et al., Internet Engineering Task Force (IETF) Internet Draft, *a Framework for Multiprotocol Label Switching*, draft-ieft-mpls-framework-05.txt, Sep. 1999.

Rosen et al., Interent Engineering Task Force (IETF) Internet Draft, *Multiprotolcol Label Switching Architecture*, draft-ietf-mpls-arch-06.txt. Aug. 1999.

Andersson et al., Internet Engineering Task Force (IEFT) Internet Draft, *LDP Specification*, draft-ietf-mpls-Idp-04.txt, May 1999.

* cited by examiner

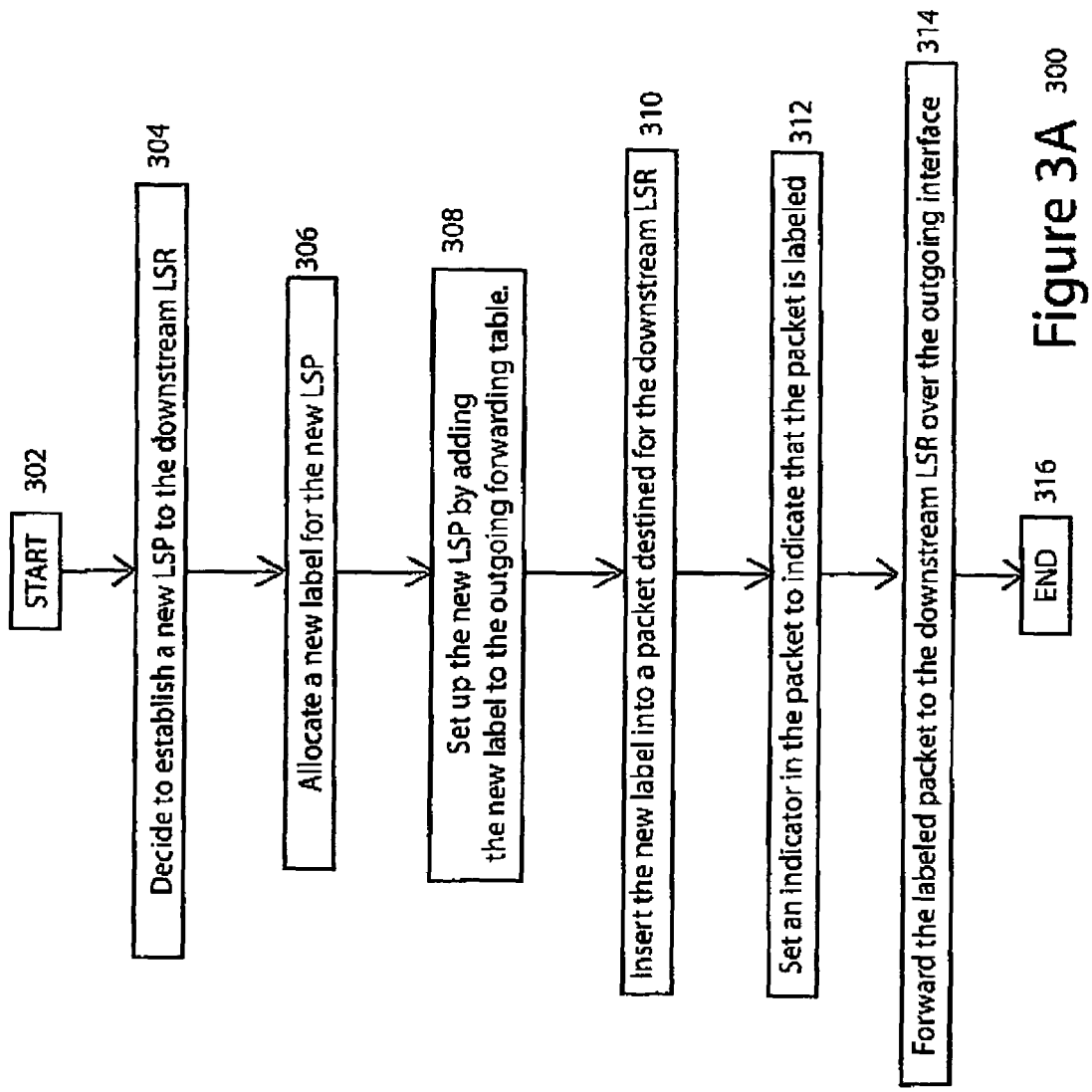

SYSTEM, DEVICE, AND METHOD FOR ESTABLISHING AND REMOVING A LABEL SWITCHED PATH IN A COMMUNICATION NETWORK

FIELD OF THE INVENTION

The present invention relates generally to communication systems, and more particularly to establishing and removing a label switched path in a communication network.

BACKGROUND OF THE INVENTION

In today's information age, communication devices, such as computers and computer peripherals, are often internetworked over a communication network. A common networking model routes packets of information within the communication network using a networking protocol such as the Internet Protocol (IP) or other network layer protocol. Some networking protocols, such as IP, are considered to be "connectionless" networking protocols. In a connectionless networking protocol, each packet of information includes a network layer address, and each router forwards the packet of information based upon the network layer address according to predetermined signaling and routing protocols, such as the Open Shortest Path First (OSPF) protocol, the Routing Information Protocol (RIP), Hello, Border Gateway Protocol (BGP), RSVP, or other routing protocol.

Thus, each router makes an independent forwarding decision for the packet based upon the network layer address. Essentially, each router partitions the entire set of network layer addresses into a number of Forwarding Equivalence Classes (FECs), and each FEC is mapped to a particular outgoing path (or set of paths, in the case of multi-path routing) based upon the routing protocol. The router determines an FEC for each packet of information based upon the network layer address of the packet, and forwards the packet of information to the corresponding outgoing path (or set of paths).

Network layer routing requires each router to process each packet of information at the network layer. This is an expensive and time-consuming operation that limits the performance of some routers and even prevents certain devices that do not support the networking protocol from performing routing and other functions on the packets.

Label switching can be used to eliminate the network layer processing by certain devices in the communication network. Label switching enables a packet to be transported across a network domain (referred to hereinafter as an "autonomous system" or "AS") using labels rather than the network layer address. Specifically, a Label Switched Path (LSP) is established from an ingress point border device to an egress point border device in the AS. The LSP traverses a number of label switching devices. Each label switching device assigns a short, fixed-length value (i.e., a "label") to each FEC that is supports. When the packet enters the ingress point border device, the ingress point border device uses the network address to assign the packet to a particular FEC, and inserts the corresponding label into the packet, specifically within a packet header. Each subsequent label switching device along the LSP uses the label in the packet to determine the next hop FEC for the packet, and replaces the label in the packet with a new label corresponding to the next hop FEC for the packet. The egress point border device removes the label from the packet. Thus, only the border devices process the packet at the network layer, while the intermediate devices process the packet based upon the label only.

The Internet Engineering Task Force (IETF) Multi-Protocol Label Switching (MPLS) working group has defined an MPLS architecture for utilizing label switching for internetworking. MPLS is considered to be "multi-protocol" because it can be used with any network layer protocol, and is not limited to IP. An MPLS framework is described in an IETF Internet Draft document entitled A FRAMEWORK FOR MULTIPROTOCOL LABELING SWITCHING, which is referenced as draft-ietf-mpls-framework-05.txt (September 1999), and is hereby incorporated by reference in its entirety. The MPLS architecture is described in an IETF Internet Draft document entitled MULTIPROTOCOL LABEL SWITCHING ARCHITECTURE, which is referenced as draft-ietf-mpls-arch-06.txt (August 1999), and is hereby incorporated by reference in its entirety.

In order to establish and remove LSPs, the various label switching devices exchange label switching information using a signaling protocol. One such signaling protocol that is used specifically for exchanging label switching information is the Label Distribution Protocol (LDP). LDP is described in an IETF Internet Draft document entitled LDP SPECIFICATION, which is referenced as draft-ietf-mpls-ldp-04.txt (May 1999), and is hereby incorporated by reference in its entirety. Label switching information can also be carried ("piggy-backed") in other signaling and routing protocols, such as OSPF, IS-IS, and RIP.

Each label switching device maintains mapping information for mapping each FEC to a corresponding label. The label mapping information is typically maintained in the various forwarding/routing tables maintained by the label switching device. It is common for the label switching device to maintain a forwarding table for each incoming interface and a forwarding table for each outgoing interface. The label mapping information maintained by the label switching device in the incoming forwarding tables enables the label switching device to quickly forward received packets that include label switching information. The label mapping information maintained by the label switching device in the outgoing forwarding tables enables the label switching device to insert label switching information into packets. For convenience, a forwarding table that includes label mapping information may be referred to as a label information base (LIB).

SUMMARY OF THE INVENTION

In accordance with one aspect of the invention, a packet-driven mechanism is used for establishing and removing a label switched path rather than using an explicit signaling protocol to exchange label switching information form an upstream label switching device to a downstream label switching device.

In accordance with another aspect of the invention, an upstream label switching device establishes a label switched path to a downstream label switching device by allocating a new label for the label switched path, setting up the label switched path by adding the new label to its forwarding table, and forwarding a labeled packet including the new label and an indicator indicating that the packet is labeled. Upon receiving the labeled packet from the upstream label switching device, the downstream label switching device sets up the label switched path by adding the new label to its forwarding table, and forwards the packet based upon network layer addressing information in the packet.

In accordance with yet another aspect of the invention, the upstream label switching device removes the label switched path by forwarding unlabeled packets to the downstream label switching device. Both devices remove the label from its respective forwarding table.

BRIEF DESCRIPTION OF THE DRAWINGS

The foregoing and other objects and advantages of the invention will be appreciated more fully from the following further description thereof with reference to the accompanying drawings wherein:

FIG. 3A is a logic flow diagram showing exemplary logic for establishing a label switched path by an upstream label switching router in accordance with an embodiment of the invention;

DETAILED DESCRIPTION OF A PREFERRED EMBODIMENT

An embodiment of the present invention uses a packet-driven mechanism to establish and remove a label switched path (LSP) between two label switching routers (LSRs) without using an explicit signaling/routing protocol to exchange label switching information. One LSR controls the establishment and removal of the LSP using the packet-driven mechanism. For convenience, the LSR that controls the establishment and removal of the LSP is referred to hereinafter as the "upstream" LSR, while the other LSR is referred to hereinafter as the "downstream" LSR (with the terms "upstream" and "downstream" denoting the role of each LSR relative to a stream of packets flowing from the upstream LSR to the downstream LSR).

Figure 1:
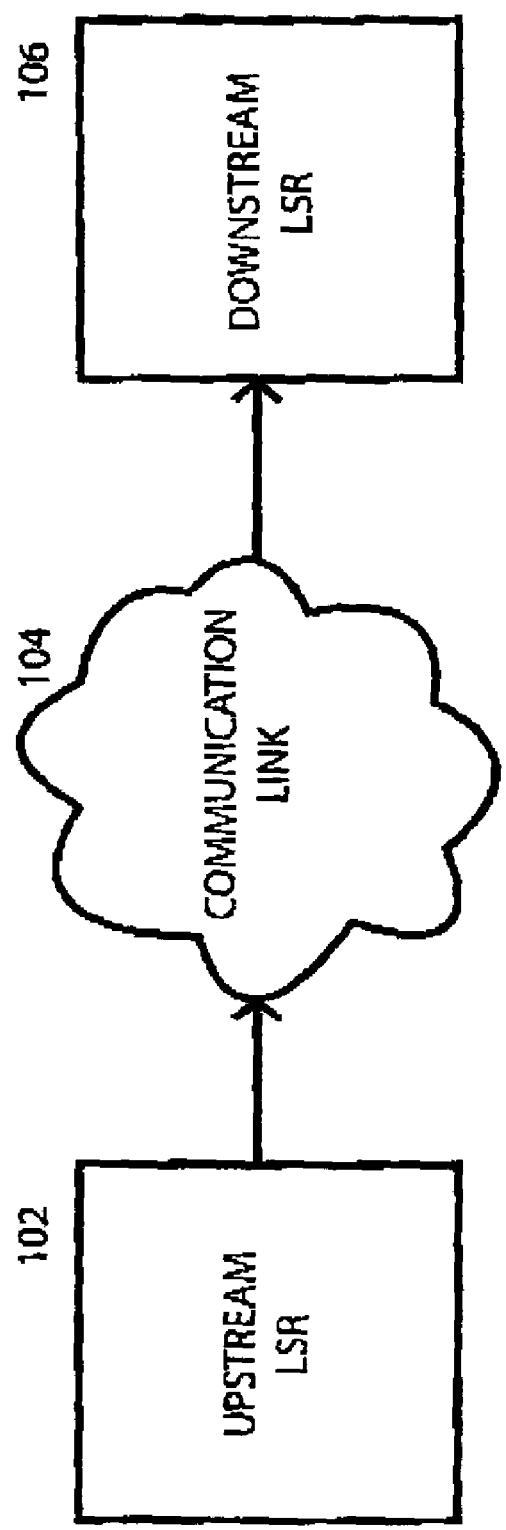
FIG. 1 is a network diagram showing an exemplary communication system for establishing a label switched path in accordance with an embodiment of the invention.

FIG. 1 is a network diagram showing an exemplary communication system 100 in accordance with an embodiment of the invention. The communication system 100 includes an upstream LSR 102 that communicates with a downstream LSR 106 over a communication link 104, such as a point-to-point link, an IP subnetwork (i.e., a subnetwork in which packets are forwarded using layer 2 addresses rather than layer 3 IP addresses), a Local Area Network (LAN), or an Asynchronous Transfer Mode (ATM) LAN Emulation (LANE). For the purpose of the present discussion, packet flow is from the upstream LSR 102 to the downstream LSR 106, although in actuality there are typically packet flows between the upstream LSR 102 and the downstream LSR 106 in both directions.

Figure 2:
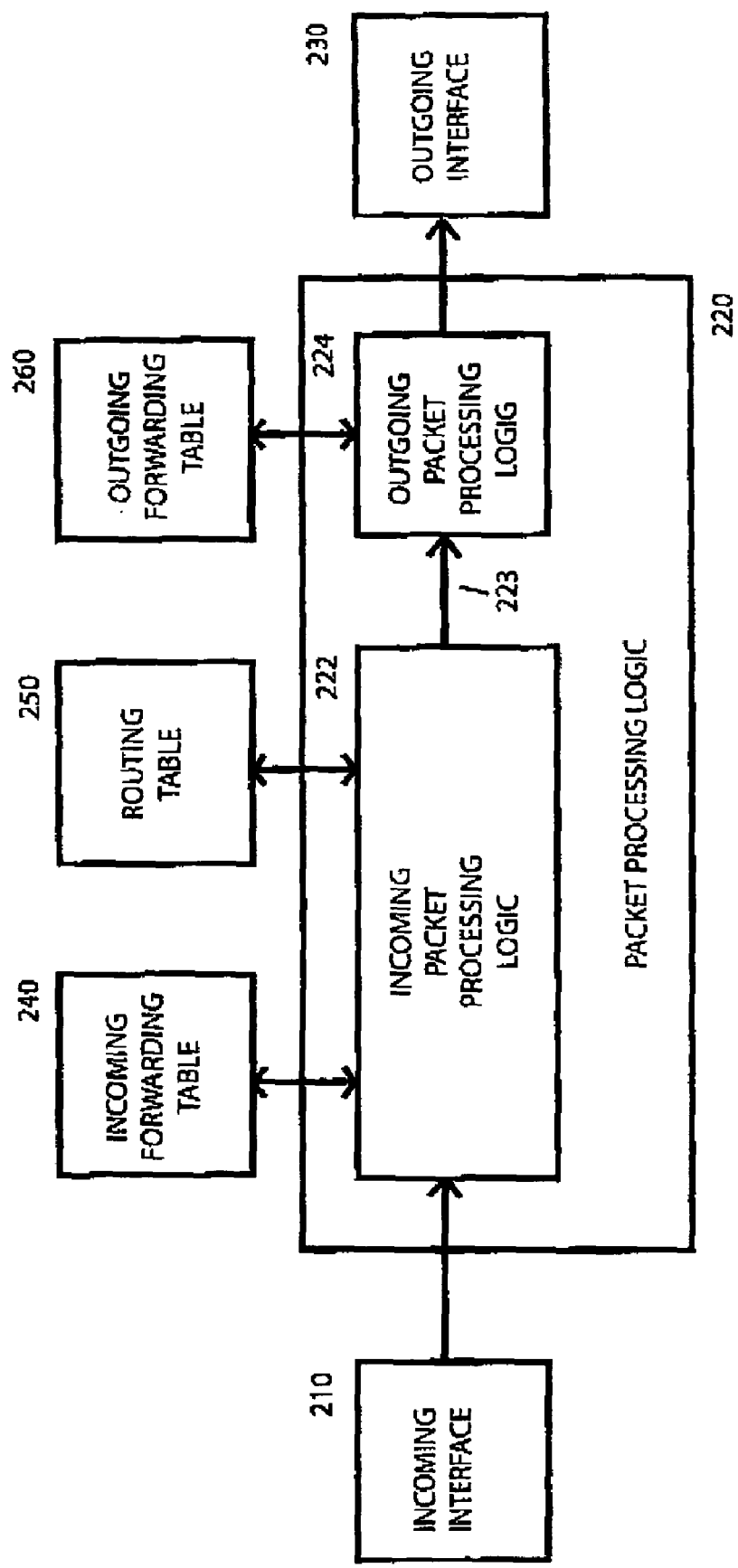
FIG. 2 is a block diagram showing the relevant logic blocks of an exemplary label switching device in accordance with an embodiment of the invention.

FIG. 2 shows the relevant logic blocks of an exemplary LSR, such as the upstream LSR 102 and the downstream LSR 106. Among other things, each LSR (102, 106) includes an incoming interface 210, packet processing logic 220 including incoming packet processing logic 222 and outgoing packet processing logic 224, an outgoing interface 230, and various routing/forwarding tables including, conceptually, an incoming forwardly table 240, a routing table 250, and an outgoing forwarding table 260. The incoming forwarding table 240 contains label mapping information for performing label switching on packets received over the incoming interface 210. The outgoing forwarding table 260 contains label mapping information for inserting label switching information into packets forwarded over the outgoing interface 230. The routing table 250 contains routing information for routing packets based upon network layer addressing information. These routing/forwarding tables may be separate or combined.

A packet received over the incoming interface 210 is forwarded by the packet processing logic 220 to the outgoing interface 230. Within the packet processing logic 220, the incoming packet processing logic 222 determines the FEC and outgoing interface for the packet (which, in this example, is the outgoing interface 230), and forwards the packet to the outgoing packet processing logic 224 associated with the outgoing interface 230. Briefly, if the packet includes label switching information that is associated with an LSP mapped in the incoming forwarding table 240, then the incoming packet processing logic 222 forwards the packet based upon the label switching information according to the label mapping information contained in the incoming forwarding table 240. Otherwise, the incoming packet processing logic 222 forwards the packet based upon the network layer addressing information in the packet according to the routing information contained in the routing table 250. The outgoing packet processing logic 224 determines whether the packet is associated with an LSP mapped in the outgoing forwarding table 260, and inserts label switching information to the packet before forwarding the packet to the outgoing interface 230 if the packet is associated with an LSP mapper in the outgoing forwarding table 260.

In order to establish LSP from the upstream LSR 102 to the downstream LSR 106 in an embodiment of the invention, the upstream LSR 102 sets up the LSP by allocating a new label for the LSP and adding the new label to its outgoing forwarding table (LIB) 260, and begins using the new label by inserting the new label into packets along with an indicator that the packets are labeled. Upon receiving a first labeled packet from the upstream LSR 102 including the new label and the indicator, the downstream LSR 106 sets up the LSP by adding the new label to its incoming forwarding table (LIB) 240, and forwards the packet based upon the network layer addressing information in the packet. The incoming forwarding table (LIB) 240 maps the new label to the corresponding FEC and outgoing interface 230 so that subsequent labeled packets can be forwarded based upon the label switching information rather than the network layer addressing information. In this way, a LSP is established from the upstream LSR 102 to the downstream LSR 106 without explicitly setting up the LSP and without using a signaling protocol to exchange label switching information.

Thus, when the upstream LSR 102 decides that it wants a label matched to a forwarding table entry on one of its outgoing interfaces, the upstream LSR 102 allocates a new label, and adds the new label to its outgoing forwarding table 260. The upstream LSR 102 also adds the new label to packets being forwarded over the outgoing interface 230, and sets an indicator in each such packet to indicate that the packets are labeled. The upstream LSR 102 forwards the labeled packets to the downstream LSR 106 over its outgoing interface 230.

FIG. 3A is a logic flow diagram showing exemplary logic 300 for establishing a LSP by the upstream LSR 102. Beginning at step 302, and upon deciding to establish a new LSP to the downstream LSR 106, in step 304, the logic allocates a new label for the new LSP, in step 306, and sets up the new LSP by adding the new label to the outgoing forwarding table 260, in step 308. The logic inserts the new label in a packet that is destined for the downstream LSR 106, in step 310, and sets an indicator in the packet to indicate that the packet is labeled, in step 312. The logic forwards the labeled packet to the downstream LSR 106 over the outgoing interface 230, in step 314. The logic 300 terminates in step 316.

The decision by the upstream LSR 102 to establish the LSP to the downstream LSR 106 can be made in various ways and at various times. Generally speaking, the upstream LSR 102 may decide to establish the LSP to the downstream LSR 106 independently of whether label switching is used on other communication links, or the upstream LSR 102 may decide to establish the LSP to the downstream LSR 106 upon determining that label switching is used on another communication link (and particularly on the communication link to the upstream LSR 102 from its upstream neighboring device). For convenience, the former approach in which the upstream LSR 102 decides to establish the LSP to the downstream LSR 106 independently of whether label switching is used on other communication links is referred to hereinafter as the "independent mode" of operation, and the latter approach in which the upstream LSR 102 decides to establish the LSP to the downstream LSR 106 upon determining that label switching is used on another communication link is referred to hereinafter as the "ordered mode" of operation.

In the independent mode of operation, the upstream LSR 102 decides to establish the LSP to the downstream LSR 106 independently of whether label switching is used on other communication links. Specifically, the upstream LSR 102 makes an independent decision to establish the LSP to the downstream LSR 106, and sets up the LSP by mapping the new label to a particular FEC/outgoing interface in the outgoing forwarding table. Subsequently, the upstream LSR 102 labels and forwards packets using the mapping that is set up in the outgoing forwarding table.

Figure 3B:
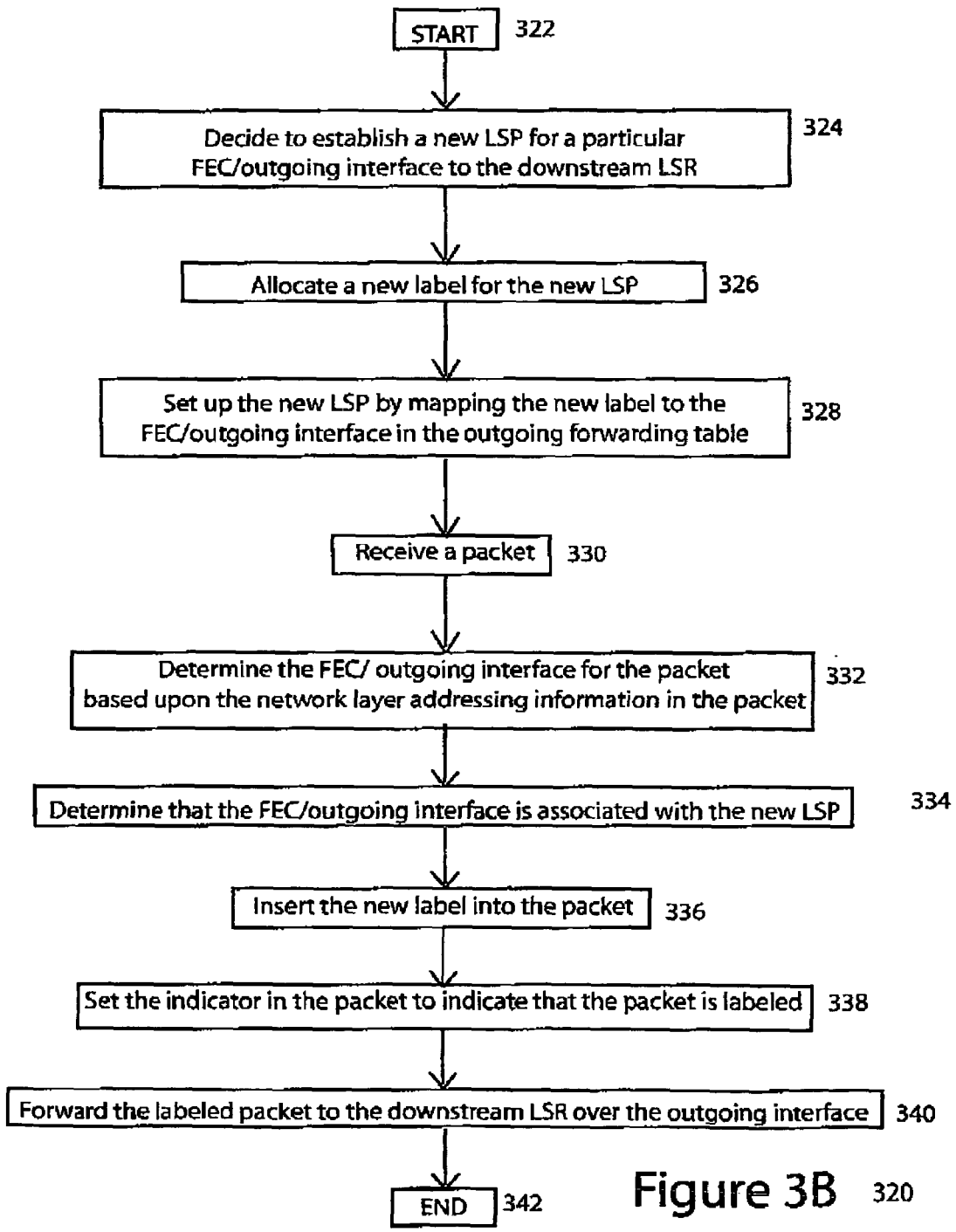
FIG. 3B is a logic flow diagram showing exemplary logic for establishing a label switched path by an upstream label switching router in accordance with embodiment of the invention using an independent mode of operation.

FIG. 3B is a logic flow diagram showing exemplary independent mode logic 320 for establishing a LPS by the upstream LSR 102. Beginning at step 322, and upon deciding to establish a new LSP for a particularly FEC/outgoing interface to the downstream LSR 106, in step 324, the logic allocates a new label for the new LSP, in step 326, and sets up the new LSP by mapping the new label to the FEC/outgoing interface in the outgoing forwarding table 260, in step 328. Upon receiving a packet, in step 330, the logic proceeds to determine the FEC/outgoing interface for the packet based upon the network layer addressing information in the packet, in step 332. Assuming the logic determines that the FEC/outgoing interface for the packet is associated with the new LSP, in step 334, the logic inserts the new label into the packet, in step 336, and sets the indicator in the packet to indicate that the packet is labeled, in step 338. The logic forwards the labeled packet to the downstream LSR 106 over the outgoing interface 230, in step 340. The logic 320 terminates in step 342.

In the ordered mode of operation, the upstream LSR 102 decides to establish the LSP to the downstream LSR 106 upon determining that label switching is used on another communication link. For example, the upstream LSR 102 may decide to establish the LSP to the downstream LSR 106 when a LSP is established to the upstream LSR 102 from its upstream neighboring device (not shown) using an explicit signaling protocol (e.g., LDP), or the upstream LSR 102 may decide to establish the LSP to the downstream LSR 106 upon receiving a labeled packet from its upstream neighboring device. The upstream LSR 102 sets up the LSP by mapping the new label to the appropriate FEC/outgoing interface in the outgoing forwarding table (which, for the latter case, is the FEC/outgoing interface associated with the labeled packet that is received). The upstream LSR 102 labels and forwards packets using the mapping that is set up in the outgoing forwarding table.

Figure 3C:
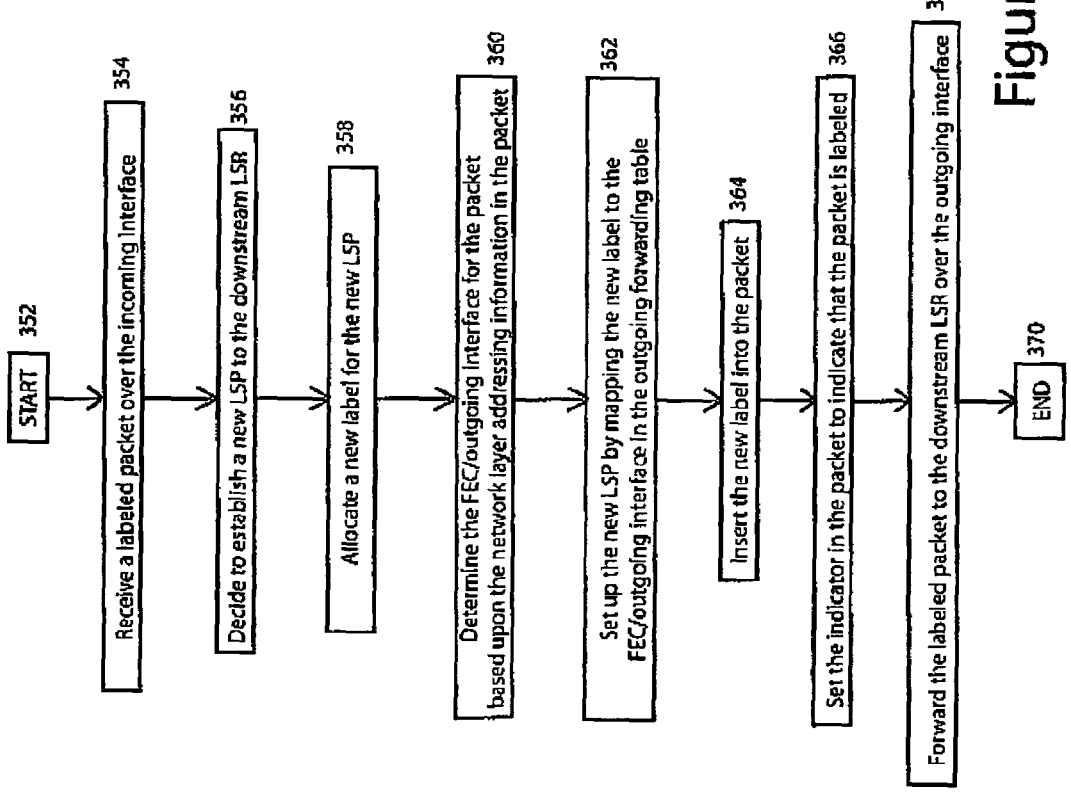
FIG. 3C is a logic flow diagram showing exemplary logic for establishing a label switched path by an upstream label switching router in accordance with an embodiment of the invention using an ordered mode of operation.

FIG. 3C is a logic flow diagram showing exemplary ordered mode logic 350 for establishing a LSP by the upstream LSR 102. Beginning at step 352, and upon receiving a labeled packet over the incoming interface 210, in sep 354, the logic decides to establish a new LSP to the downstream LSR 106, in step 356. The logic allocates a new label for the new LSP, in step 358. The logic also determines the FEC/outgoing interface for the packet based upon the network layer addressing information in the packet, in step 360. The logic sets up the LSP by mapping the new label to the FEC/outgoing interface in the outgoing forwarding table, in step 362. The logic inserts the new label into the packet, in step 364, and sets the indicator in the packet to indicate that the packet is labeled, in step 366. The logic forwards the labeled packet to the downstream LSR 106 over the outgoing interface 230, in step 368. The logic 350 terminates in step 370.

When the downstream LSR 106 receives the labeled packet from the upstream LSR 102 including the new label, the downstream LSR 106 determines the FEC and outgoing interface for the packet (which, in this example, is the outgoing interface 230) based upon the network layer addressing information in the packet, and adds the new label to its incoming forwarding table 240. The incoming forwarding table maps the new label to the corresponding FEC and outgoing interface so that subsequent packets can be forwarded base upon the label switching information rather than the network layer addressing information. The downstream LSR 106 forwards the packet over its outgoing interface 230 based upon the network layer addressing information.

Figure 4:
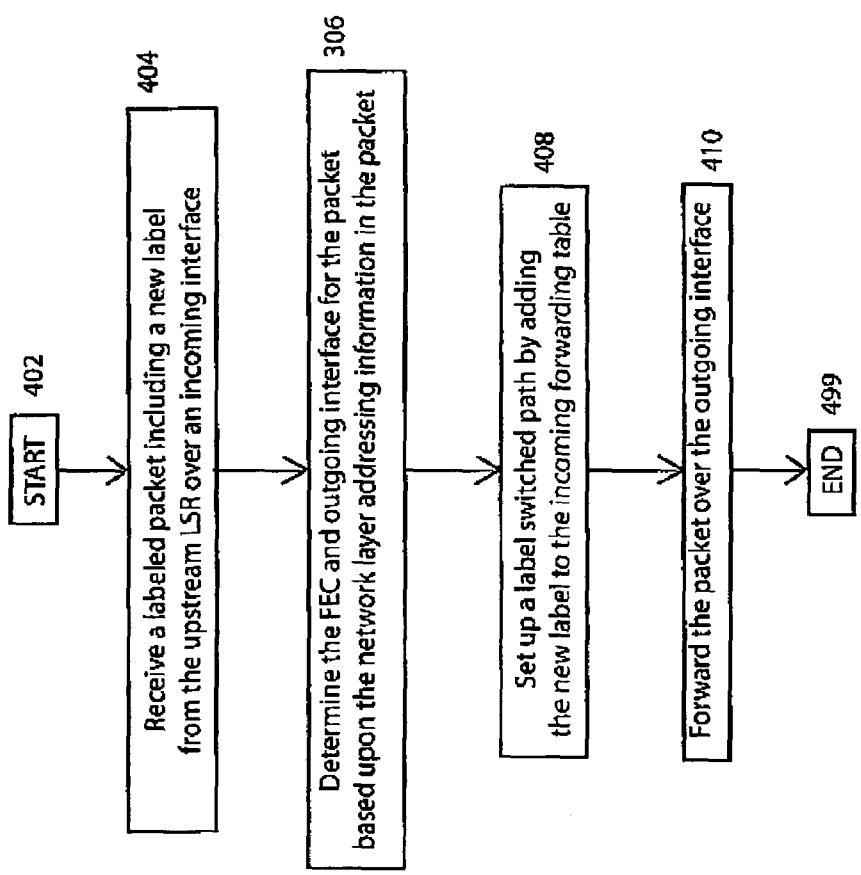
FIG. 4 is a logic flow diagram showing exemplary logic for establishing a label switched path by a downstream label switching router in accordance with an embodiment of the invention.

FIG. 4 is a logic flow diagram showing exemplary logic 400 for establishing the LSP by the downstream LSR 106. Beginning at step 402, and upon receiving a labeled packet including a new label from the upstream LSR 102 over the incoming interface 210, in step 404, the logic determines the FEC and outgoing interface for the packet based upon the network layer addressing information in the packet in step 406. The logic sets up the LSP by adding the new label to the incoming forwarding table 240, in step 408. The logic forwards the packet over the outgoing interface 230 with or without label switching information, as determined by the packet processing logic 220.

When the upstream LSR 102 wants to step using the LSP, the upstream LSR 102 forwards unlabeled packets to the downstream LSR 106. The upstream LSR 102 does not insert a label into the packets and does not set the indicator in the packets. Each LSR (102, 106) typically removes the label from its respective forwarding table after determining that the label has been unused for a predetermined amount of time.

Similarly, if a routing change occurs such that the downstream LSR 106 is no longer the next hop device for a particular FEC, the upstream LSR 102 stops forwarding packets to the downstream LSR 106. Each LSR (102, 106) typically removes the label from its respective forwarding table after determining that the label has been unused for a predetermined amount of time. The upstream LSR 102 may establish a new LSP to the new next hop device using a different label.

Thus, when the upstream LSR 102 decides to stop using the LSP, the upstream LSR 102 forwards unlabeled packets to the downstream LSR 106, and removes the label from its outgoing forwarding table 260.

Figure 5:
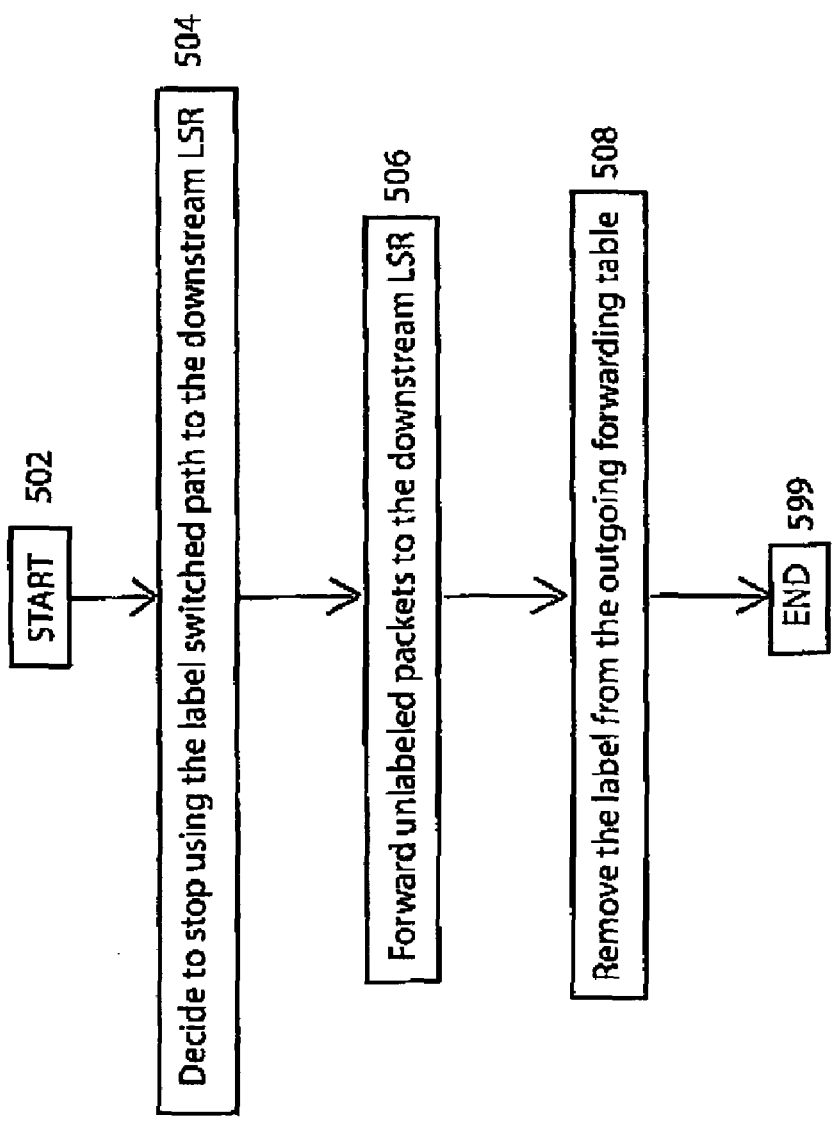
FIG. 5 is a logic flow diagram showing exemplary logic for removing a label switched path by an upstream label switching router in accordance with an embodiment of the invention.

FIG. 5 is a logic flow diagram showing exemplary logic 500 for removing the LSP by the upstream LSR 102. Beginning at step 502, and upon deciding to stop using the LSP to the downstream LSR 106, the logic forwards unlabeled packets to the downstream LSR 106, in step 506. The logic also removes the label from the outgoing forwarding table 260, in step 508, for example, after a predetermined amount of time. The logic 500 terminates in step 599.

When the downstream LSR 106 determines that the LSP is no longer being used, the downstream LSR 106 removes the label from its incoming forwarding table 240. The downstream LSR 106 forwards unlabeled packets based upon the network layer addressing information in the packets.

Figure 6:
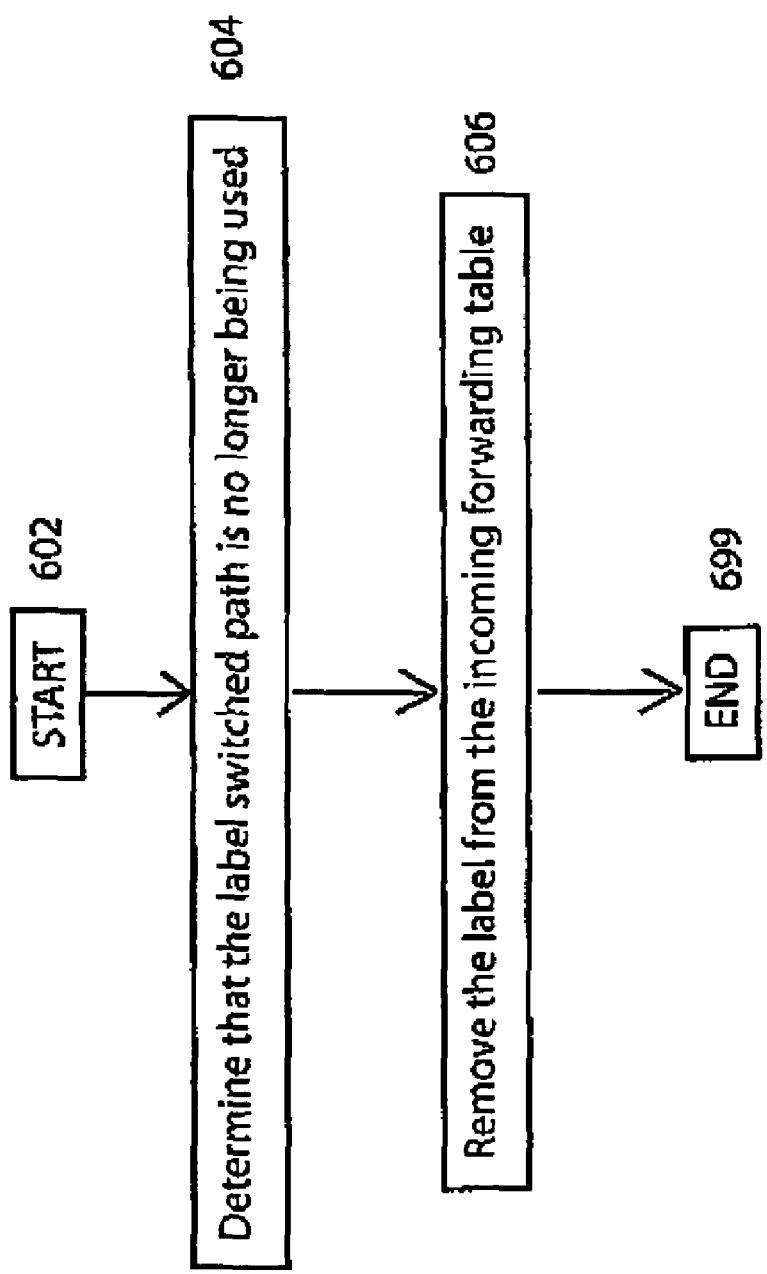
FIG. 6 is a logic flow diagram showing exemplary logic for removing a label switched path by a downstream label switching router in accordance with an embodiment of the invention.

FIG. 6 is a logic flow diagram showing exemplary logic 600 for removing the LSP by the downstream LSR 106. Beginning at step 602, and upstream determining that the LSP is no longer being used (e.g., after a predetermined amount of time), in step 604, the logic removes the label from the incoming forwarding table, in step 606. The logic 600 terminates in step 699.

In an exemplary embodiment of the present invention, the upstream LSR 102 uses the "ethertype" field in the packet to indicate the packet is labeled. Certain media, such a Ethernet and the Point-to-Point Protocol (PPP), include an ethertype field that is used to specify the type of payload information that is carried in the packet. When label switching information is included in the packet, a predetermined value (to be assigned by an assigned number authority) is included in the ethertype field of the packet to indicate that the packet is labeled.

Figure 7:
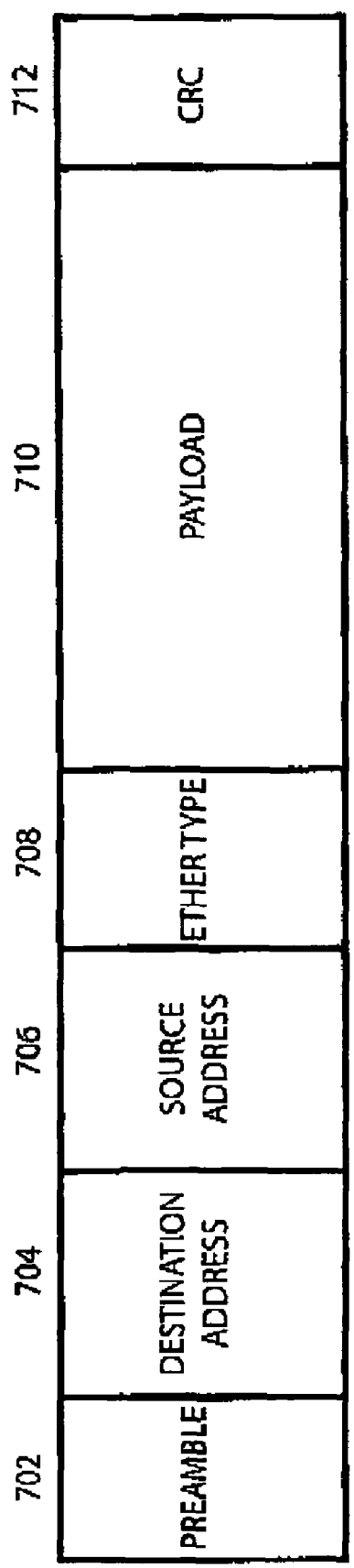
FIG. 7 is a block diagram showing the fields of an Ethernet frame (packet) in accordance with an embodiment of the invention.

FIG. 7 shows the format of an exemplary Ethernet frame (packet) 700 that may be used to convey label switching information. The Ethernet frame (packet) 700 includes a preamble field 702, a destination address field 704, a source address field 706, an ethertype field 708, a payload field 710, and a cyclic redundancy check (CRC) field 712. When the upstream LSR 102 decides to use label switching, the upstream LSR 102 inserts label switching information along with packet information into the payload field 710 and sets the ethertype field 708 to indicate that the payload 710 includes label switching information. When the upstream LSR 102 decides to stop using label switching, the upstream LSR 102 does not insert label switching information into the payload field 710 and does not set the ethertype field 708 to indicate that the payload field 710 does not include label switching information. The downstream LSR 106 examines the ethertype field to determine whether a particular packet is labeled or unlabeled, and processes the packet accordingly.

It should be noted that the downstream LSR 106 may use the same packet-based mechanism for establishing and removing a LSP to the upstream LSR 102 and/or to a further downstream LSR (not shown). In this case, the downstream LSR 106 would be considered the "upstream" device for the additional LSP.

During the course of processing packets, the upstream LSR 102 must decide whether or not to label each individual packet. If a particular packet is associated with an existing LSP, then the upstream LSR 102 labels the packet before forwarding the labeled packet. If the upstream LSR 102 decides to establish a new LSP, then the upstream LSR 102 allocates a new label for the LSP, sets up the LSP, and labels the packet using the new label before forwarding the labeled packet. If the packet is not associated with an existing or new LSP, then the upstream LSR 102 forwards the unlabeled packet.

Figure 8:
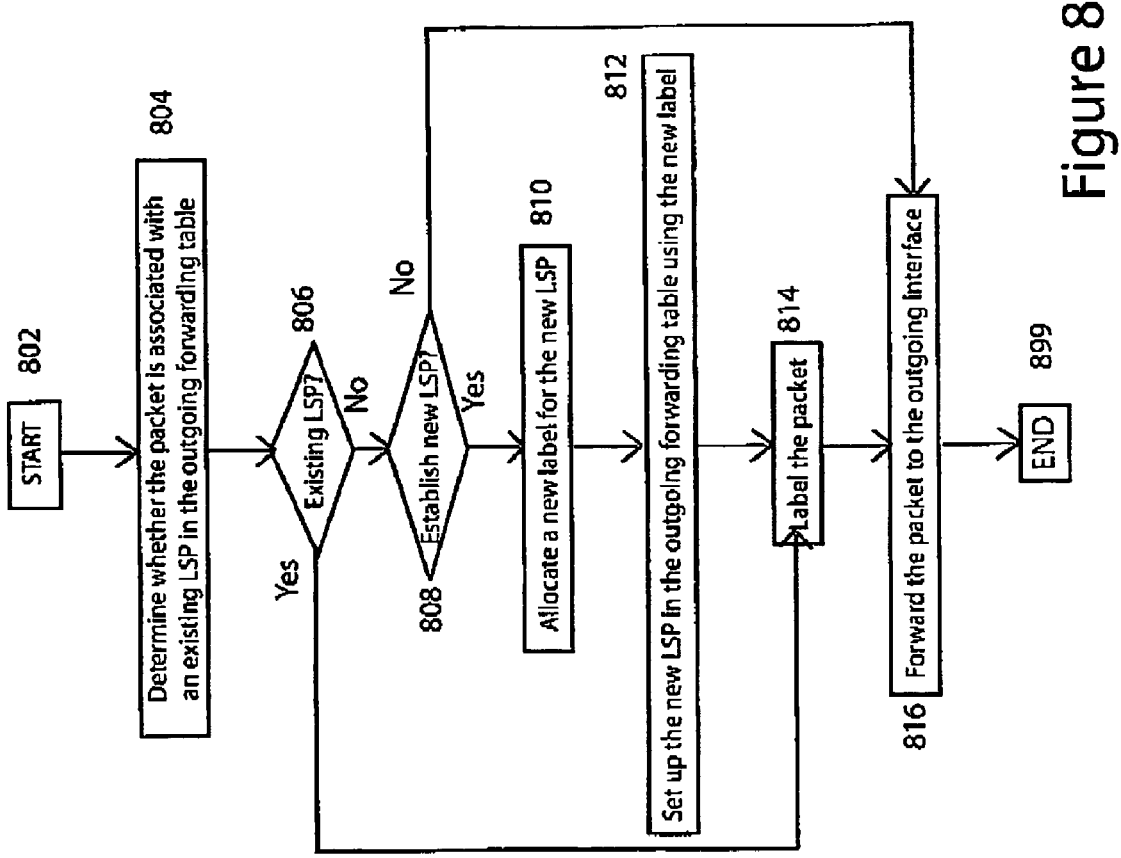
FIG. 8 is a logic flow diagram showing exemplary logic for forwarding a packet by an upstream label switching router in accordance with an embodiment of the invention.

FIG. 8 is a logic flow diagram showing exemplary logic 800 for forwarding a packet by the upstream LSR 102, and an particular by the outgoing packet processing logic 224 of the upstream LSR 102. Beginning at step 802, and upon obtaining a packet to be forwarded, the logic determines whether the packet is associated with an existing LSP mapped in the outgoing forwarding table 260, in step 804. If the packet is associated with an existing LSP (YES in step 806), then the logic labels the packet, in step 814, and forwards the labeled packet to the outgoing interface 230, in step 816. If the packet is not associated with an existing LSP (NO in step 806), then the logic decides whether to establish a new LSP, in step 808. If the logic decides not to establish a new LSP (NO in step 808), then the logic forwards the unlabeled packet to the outgoing interface, in step 816. If the logic decides to establish a new LSP (YES in step 808), then the logic allocates a new label for the LSP, in step 810, and sets up the new LSP in the outgoing forwarding table 260 using the new label, in step 812. The logic also labels the packet, in step 814, and forwards the labeled packet to the outgoing interface 230, in step 816. The logic 800 terminates in step 899.

Figure 9:
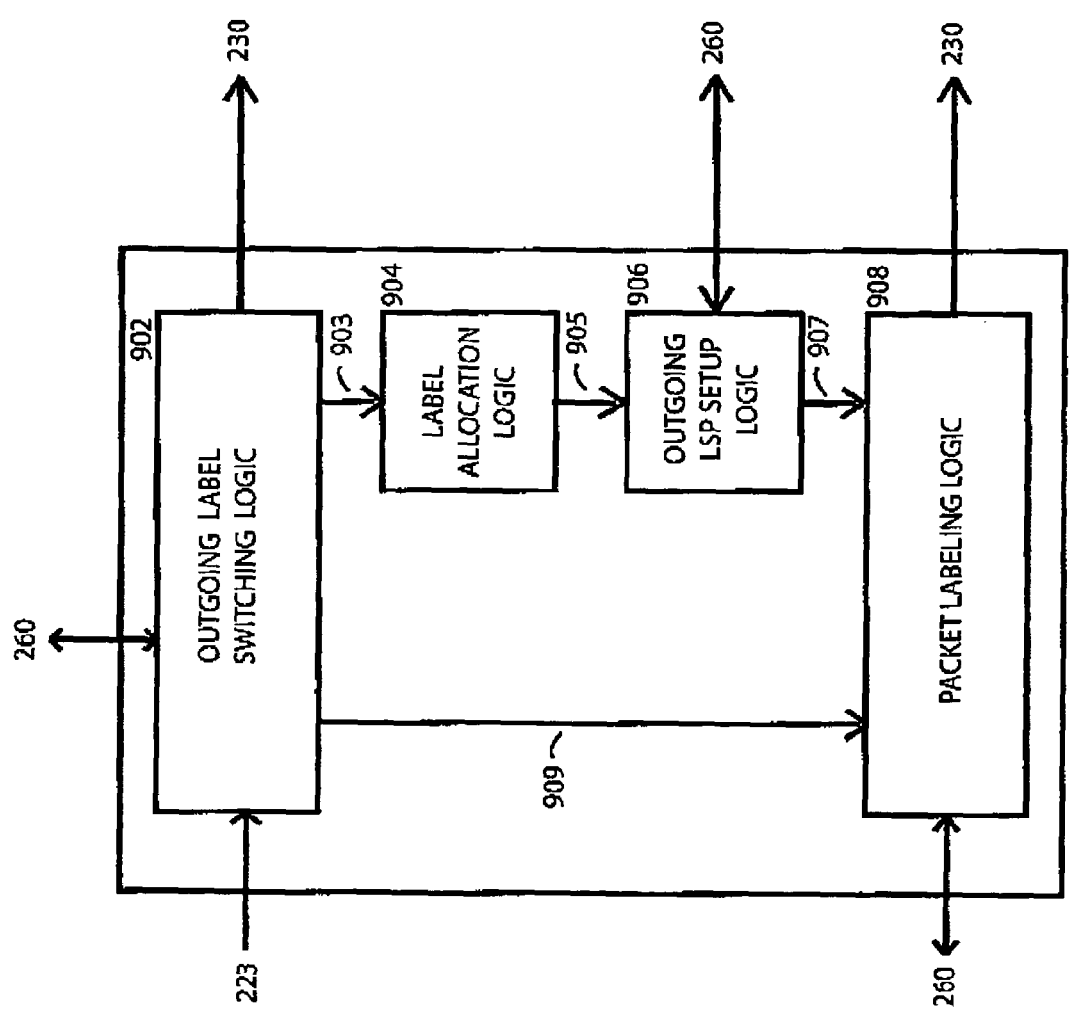
FIG. 9 is a block diagram showing the relevant logic blocks of the outgoing packet processing logic of an upstream label switching router in accordance with an embodiment of the invention.

FIG. 9 is a block diagram showing the relevant logic blocks of the outgoing packet processing logic 224 of the upstream LSR 102. The outgoing packet processing logic 224 includes, among other things, outgoing label switching logic 902, label allocation logic 904, outgoing LSP setup logic 906, and packet labeling logic 908. The outgoing label switching logic 902 receives packets over the interface 223, and decides for each packet whether to forward the packet labeled or unlabeled. The outgoing label switching logic 902 uses the outgoing forwarding table 260 to determine whether the packet is associated with an existing LSP, a new LSP to be established, or no LSP. If the packet is not associated with an existing or new LSP, then the outgoing label switching logic 902 forwards the packet unlabeled to the outgoing interface 230. If the packet is associated with an existing LSP, then the outgoing label switching logic 902 forwards the packet to the packet labeling logic (indicated by the arrow 909), which uses the outgoing forwarding table 260 to label the packet and forward the labeled packet to the outgoing interface 230. If the packet is associated with a new LSP to be established, then the outgoing label switching logic 902 forwards the packet to the label allocation logic 904 (indicated by the arrow 903). The label allocation logic 904 allocates a new label for the LSP, and forwards the packet to the outgoing LSP setup logic 906 (indicated by the arrow 905). The outgoing LSP setup logic 906 sets up the new LSP by adding the new label to the outgoing forwarding table 260, and forwards the packet to the packet labeling logic 908 (indicated by the arrow 907). The packet labeling logic 908 labels the packet and forwards the labeled packet to the outgoing interface 230.

During the course of processing packets, the downstream LSR 106 may receive packets relating to different streams, some of which use label switching and others that do not. Thus, the downstream LSR 106 must be able to differentiate between packets that include label switching information and packets that do not include label switching information. Furthermore, the downstream LSR 106 must be able to differentiate between a packet that includes a new label for a new LSP to be established and a packet that includes a label for an existing LSP.

Thus, when the downstream LSR 106 receives a packet, the downstream LSR 106 determines whether the packet is labeled, for example, based upon the ethertype field of the packet. If the packet is not labeled, then the downstream LSR 106 forwards the packet based upon the network layer addressing information in the packet. If the packet is labeled, then the downstream LSR 106 determines whether the label is a new label for a LSP to be established or a label for an existing LSP, specifically by searching for the label in the incoming forwarding table 240. If the label is a new label, then the downstream LSR 106 adds the new label to the incoming forwarding table 240 and forwards the packet based upon the network layer addressing information. If the label is an existing label, then the downstream LSR 106 forwards the packet based upon the label in the packet.

It should be noted that, when forwarding the packet, the downstream LSR 106 may remove a label from the packet and/or insert a label into the packet, as determined by the label mapping information in the outgoing forwarding table 260. Thus, the downstream LSR 106 may receive an unlabeled packet and forward an unlabeled packet, receive an unlabeled packet and forward a labeled packet, received a labeled packet and forward an unlabeled packet, or receive a labeled packet and forward a labeled packet.

Figure 10:
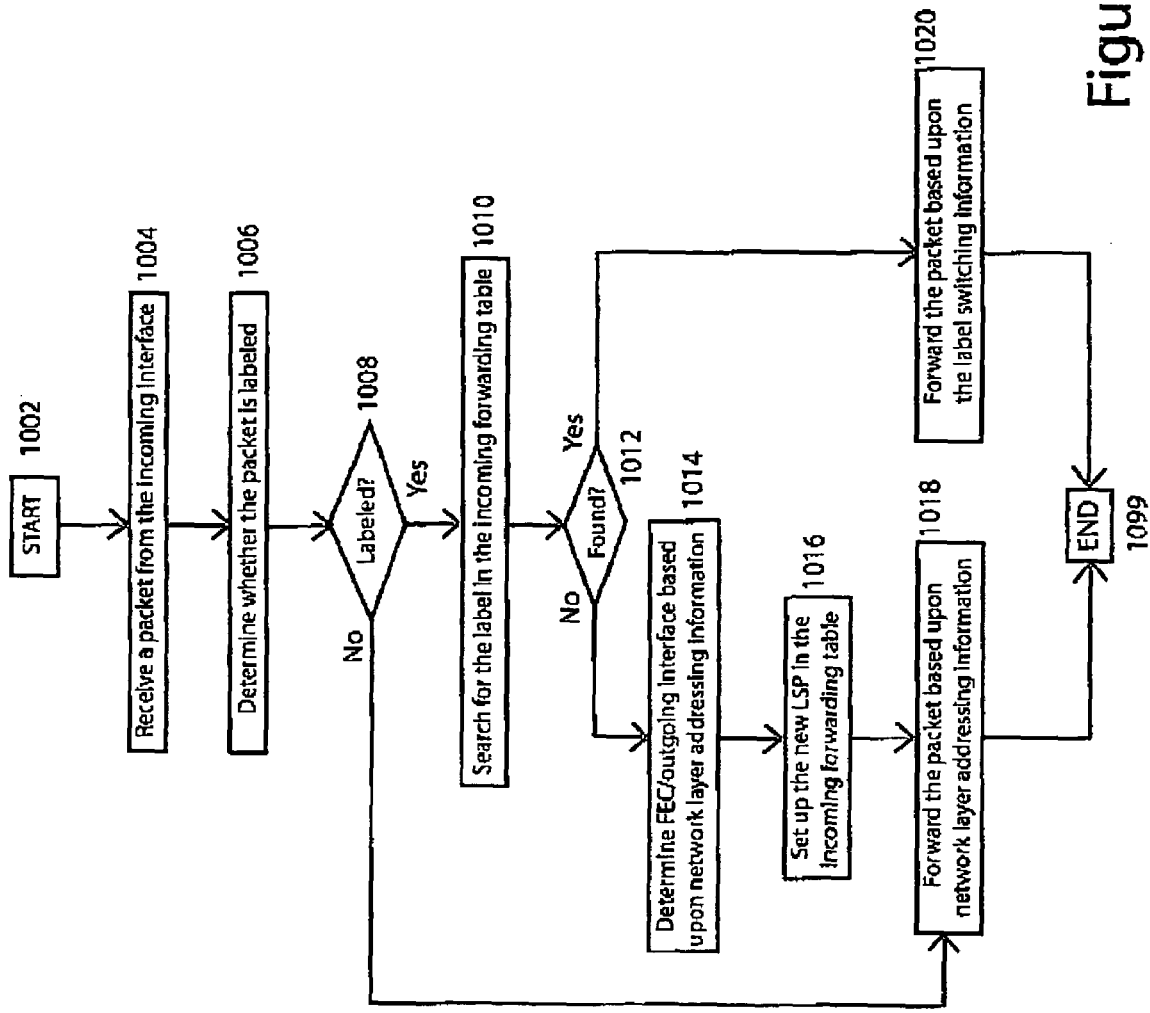
FIG. 10 is a logic flow diagram showing exemplary logic for processing a packet by a downstream label switching router in accordance with an embodiment of the invention.

FIG. 10 is a logic flow diagram showing exemplary logic 1000 for processing a packet by the downstream LSR 106, and in particular by the incoming packet processing logic 222 of the downstream LSR 106. Beginning at step 1002, and upon receiving a packet from the incoming interface 210, in step 1004, the logic first determines whether the packet is labeled, in step 1006. If the packet is not labeled (NO in step 1008), then the logic forwards the packet based upon the network layer addressing information in the packet, in step 1018. If the packet is labeled (YES in step 1008), then the logic proceeds to search for the label in the incoming forwarding table 240, in step 1010. If the logic does not find the label in the incoming forwarding table 230 (NO in step 1012), indicating that the label is a new label for a LSP to be established, then the logic determines the FEC and outgoing interface for the packet based upon the network layer addressing information in the packet, in step 1014. The logic sets up the new LSP in the incoming forwarding table, in step 1016, and forwards the packet based upon the network layer addressing information, in step 1018. If the logic finds the label in the incoming forwarding table (YES in step 1012), then the logic forwards the packet based upon the label in the packet, in step 1020. The logic 1000 terminates in step 1099.

Figure 11:
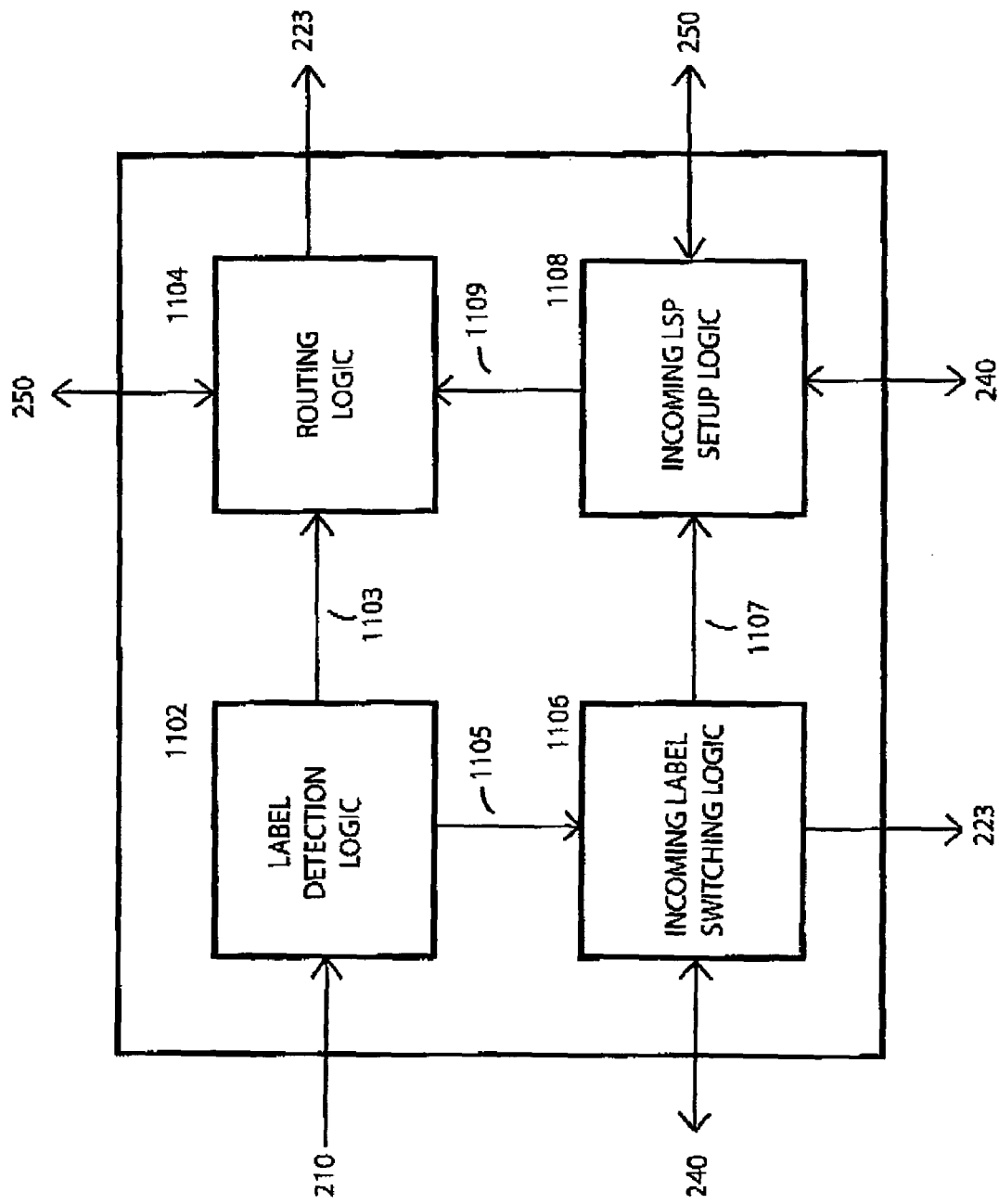
FIG. 11 is a block diagram showing the relevant logic blocks of the incoming packet processing logic of a downstream label switching router in accordance with an embodiment of the invention.

FIG. 11 is a block diagram showing the relevant logic blocks of the incoming packet processing logic 222 of the downstream LSR 106. The incoming packet processing logic 222 includes, among other things, label detection logic 1102, routing logic 1104, incoming label switching logic 1106, and incoming LSP setup logic 1108. The label detection logic 1102 receives packets from the incoming interface 210, and determines for each packet whether the packet is labeled or unlabeled. If the packet is unlabeled, then the label detection logic 1102 forwards the packet to the routing logic 1104 (indicated by the arrow 1103), which forwards the packet over the interface 223 based upon the network layer addressing information in the packet according to routing information contained in the routing table 250. If the packet is labeled, then the label detection logic 1102 forwards the packet to the incoming label switching logic 1106 (indicated by the arrow 1105). The incoming label switching logic 1106 uses the incoming forwarding table 240 to determine whether the packet is associated with an existing LSP or a new LSP to be established. If the packet is associated with an existing LSP, then the incoming label switching logic 1106 forwards the packet over the interface 223 based upon the label switching information in the packet according to the label mapping information contained in the incoming forwarding table 240. If the packet is associated with a new LSP to be established, then the incoming label switching logic 106 forwards the packet to the incoming LSP setup logic 1108 (indicated by the arrow 1107), which sets up the new LSP by adding the new label to the incoming forwarding table 240 and mapping the new label to the corresponding FEC and outgoing interface based upon the network layer addressing information in the packet as well as routing information contained in the routing table 250. The incoming LSP setup logic 1108 forwards the packet to the routing logic 1104 (indicated by the arrow 1109), which forwards the packet over the interface 223 based upon the network layer addressing information in the packet according to routing information contained in the routing table 250.

Although an exemplary embodiment of the invention utilizes the ethertype field to indicate whether the packet includes label switching information, such a mechanism for indicating that the packet is labeled is only practical for media that include an ethertype field, such as Ethernet and the Point-to-Point Protocol (PPP). Other mechanisms for indicating that the packet is labeled are possible, and the present invention is in no way limited to any particularly mechanism for indicating that the packet is labeled. For example, a single bit in a header field can be used to indicate whether or not the packet is labeled (e.g., setting the bit to the value one indicates that the packet is labeled, while setting the bit to the value zero indicates that the packet is not labeled). Other mechanisms for indicating that the packet is labeled will be apparent to a skilled artisan. Such alternative mechanisms for indicating that the packet is labeled are useful for situation in which the packet includes not ethertype field.

It should be noted that the term "router" is used herein to describe a communication device that may be used in a communication system, and should not be construed to limit the present invention to any particular communication device type. Thus, a communication device may include, without limitation, a bridge, router, bridge-router (brouter), switch, node, or other communication device.

It should also be noted that the term "packet" is used herein to describe a communication message that may be used by a communication device (e.g., created, transmitted, received, stored, or processed by the communication device) or conveyed by a communication medium, and should not be construed to limit the present invention to any particular communication message type, communication message format, or communication protocol. Thus, a communication message may include, without limitation, a frame, packet, datagram, user datagram, cell, or other type of communication message.

It should also be noted that the logic flow diagram are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Often times, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, predominantly all of the described logic is implemented as a set of computer program instructions that is converted into a computer executable form, stored as such in a computer readable medium, and executed by a microprocessor within a LSR under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink, wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Thus, the present invention may be embodied as a method for controlling a label switched path by a first label switching device to a second label switching device in a communication network. The method involves deciding to establish a label switched path to the second label switching device, allocating a new label for the label switched path to the second label switched device, generating a labeled packet including the new label, and forwarding the labeled packet to the second label switching device without first explicitly establishing the label switched path to the second label switching device using a signaling protocol. Generating the labeled packet involves inserting the new label into the packet and setting an indicator, such as an ethertype field or header bit, in the packet to indicate that the packet is labeled. The method may also involve adding a forwarding table entry to a forwarding table that is typically associated with the outgoing interface. The forwarding table entry maps the new label to a forwarding equivalence class and outgoing interface for the label switched path. The method may also involve deciding to stop using the label switched path and forwarding unlabeled packets to the second label switching device, in which case the forwarding table entry is removed from the forwarding table, typically after a predetermined amount of time.

The present invention may also be embodied as a label switching device having at least an outgoing interface providing an interface for communicating with a second label switching device and packet processing logic for allocating a new label for a new label switched path to the second label switching device and for forwarding a labeled packet including the new label to the second label switching device over the outgoing interface without first explicitly establishing the new label switched path to the second label switching device using a signaling protocol. The packet processing logic includes label switching logic for deciding to establish the new label switched path, label allocation logic for allocating the new label for the new label switched path, and packet labeling logic for inserting the new label in the packet and setting an indicator in the packet, such as an ethertype field or header bit, to indicate that the packet is labeled. The label switching device also includes a forwarding table associated with the outgoing interface. The packet processing logic additionally includes label switched path setup logic for adding a forwarding table entry to the forwarding table. The forwarding table entry maps the new label to a forwarding equivalence class and the outgoing interface for the label switched path. The packet processing logic forwards unlabeled packets to the second label switching device over the outgoing interface upon deciding to stop using the label switched path, in which case the forwarding table entry is removed from the forwarding table, typically after a predetermined amount of time.

The present invention may also be embodied as a program product for use in a first label switching device. The program product includes packet processing logic for allocating a new label for a new label switched path to a second label switching device and for forwarding a labeled packet including the new label to the second label switching device over an outgoing interface without first explicitly establishing the new label switched path to the second label switching device using a signaling protocol. The packet processing logic includes label switching logic for deciding to establish the new label switched path, label allocation logic for allocating the new label for the new label switched path, and packet labeling logic for inserting the new label in the packet and setting an indicator in the packet, such as an ethertype field or header bit, to indicate that the packet is labeled. The packet processing logic also includes label switched path setup logic for adding a forwarding table entry to a forwarding table. The forwarding table entry maps the new label to a forwarding equivalence class and the outgoing interface for the label switched path. The packet processing logic forwards unlabeled packets to the second label switching device over the outgoing interface upon deciding to stop using the label switched path, in which case the forwarding table entry is removed from the forwarding table, typically after a predetermined amount of time.

The present invention may also be embodied as a method for controlled a label switched path by a first label switching device in a communication network. The method involves receiving a labeled packet including a new label from a second label switching device without first explicitly establishing the label switched path from the second label switching device to the first label switching device using a signaling protocol and setting up the label switched path using the new label. Setting up the label switched path using the new label involves determining a forwarding equivalence class and outgoing interface for the packet based upon network layer addressing information in the packet, and adding a forwarding table entry to a forwarding table. The forwarding table entry mapping the new label to the forwarding equivalance class and outgoing interface for the packet. The packet is forwarded based upon the network layer addressing information in the packet.

The present invention may also be embodied as a label switching device having at least an incoming interface providing an interface for communicating with a second label switching device and packet processing logic for receiving a labeled packet including a new label from the second label switching device over the incoming interface without first explicitly establishing the label switched path from the second label switching device to the first label switching device using a signaling protocol and for setting up the label switched path using the new label. The packet processing logic includes label detection logic for determining that the received packet is labeled, label switching logic for determining that the labeled packet is not associated with an existing label switched path, and label switched path setup logic for setting up the label switched path using the new label. The label switched path setup logic determines a forwarding equivalence class and outgoing interface for the packet based upon network layer addressing information in the packet and adds a forwarding table entry to a forwarding table. The forwarding table entry maps the new label to the forwarding equivalence class and outgoing interface for the packet. The packet processing logic includes routing logic for forwarding the packet based upon the network layer addressing information in the packet.

The present invention may also be embodied as a program product for use in a first label switching device. The program product includes packet processing logic for receiving a labeled packet including a new label from the second label switching device over an incoming interface without first explicitly establishing the label switched path from the second label switching device to the first label switching device using a signaling protocol and to setting up the label switched path using the new label. The packet processing logic includes label detection logic for determining that the received packet is labeled, label switching logic for determining that the labeled packet is not associated with an existing label switched path, and label switched path setup logic for setting up the label switched path using the new label. The label switched path setup logic determines a forwarding equivalence class and outgoing interface for the packet based upon network layer addressing information in the packet and adds a forwarding table entry to a forwarding table. The forwarding table entry maps the new label to the forwarding equivalence class and outgoing interface for the packet. The packet processing logic also includes routing logic for forwarding the packet based upon the network layer addressing information in the packet.

The present invention may also be embodied as a communication system including a first (upstream) label switching device in communication with a second (downstream) label switching device over a communication network. The first label switching device and the second label switching device utilize a packet-driven mechanism to establish a label switched path from the first label switching device to the second label switching device without first explicitly establishing the label switched path using a signaling protocol. In particular, the first label switching device allocates a new label for the label switched path and forwards a labeled packet including the new label to the second label switching device over the communication network upon deciding to establish a new label switched path to the second label switching device. The second label switching device receives the labeled packet from the first label switching device and sets up the new label switched path using the new label from the labeled packet. When the label switched path is no longer needed, the first label switching device forwards unlabeled packets to the second label switching device, and the second label switching device removes the label switched path.

Various embodiments of the present invention generate and utilize a novel protocol message including a new label for a label switched path to be established and a label indicator indicating that the protocol message is labeled. Exemplary label indicators include an ethertype field and a header bit.

The present invention may be embodied in other specific forms without departing from the scope of the invention. The described embodiments are to be considered in all respects only as illustrative and not restrictive.

We claim:

1. A method for label distribution for establishing a Multi Protocol Label Switching ("MPLS") label switched path by a first label switching device to a second, downstream label switching device in a communication network without using an explicit signaling protocol, the method comprising:
   receiving an unlabelled packet at the first label switching device;
   allocating a new MPLS label for the label switched path;
   appending the new label to the packet, thereby creating a labeled packet;
   setting an indicator in the packet to indicate that the packet is labeled; and
   forwarding the labeled packet from the first label switching device to the second, downstream label switching device,
   whereby the labeled packet itself establishes the label switched path at the downstream label switching device.

2. The method of claim 1, further comprising:
   terminating use of the label switched path; and
   forwarding unlabeled packets to the second label switching device.

3. The method of claim 2, further comprising:
   removing a forwarding table entry from a forwarding table, the forwarding table entry mapping the new label to a forwarding equivalence class and outgoing interface for the label switched path.

4. The method of claim 1, wherein the indicator is a bit in a header field of the packet, and wherein setting the indicator in the packet to indicate that the packet is labeled comprises setting the bit to a predetermined value.

5. The method of claim 1, further comprising:
   adding a forwarding table entry to a forwarding table, the forwarding table entry mapping the new label to a forwarding equivalence class and outgoing interface for the label switched path.

6. The method of claim 5, wherein the forwarding table is associated with the outgoing interface for the label switched path.

7. The method of claim 1, wherein the indicator is an ethertype field of the packet, and wherein setting the indicator in the packet to indicate that the packet is labeled comprises setting the ethertype field to a predetermined value.

8. A label switching device operable to distribute a label for establishing a label switched path in support of Multi Protocol Label Switching ("MPLS") comprising:
   an incoming interface operable to receive an unlabelled packet;
   an outgoing interface providing an interface for communicating with a second, downstream label switching device; and
   packet processing logic operably coupled to allocate a new label to the unlabelled packet for a new label switched path to the second label switching device, thereby creating a labeled packet, and to forward the labeled packet including the new label and an indicator indicating that the labeled packet is MPLS labelled, to the second label switching device over the outgoing interface without first explicitly establishing the new label switched path to the second label switching device using a signaling protocol,
   whereby the labeled packet itself establishes the label switched path at the downstream label switching device.

9. The label switching device of claim 8, wherein the packet processing logic comprises:
   label switching logic operably coupled to decide to establish the new label switched path;
   label allocation logic operably coupled to allocate the new label for the new label switched path; and
   packet labeling logic operably coupled to insert the new label in the packet and set the indicator in the packet to indicate that the packet is labeled.

10. The label switching device of claim 9, wherein the indicator is a bit in a deader field of the packet, and wherein the packet labeling logic is operably coupled to set the bit to a predetermined value to indicate that the packet is labeled.

11. The label switching device of claim 9, wherein the indicator is an ethertype field of the packet, and wherein the packet labeling logic is operably coupled to set the ethertype field to a predetermined value to indicate that the packet is labeled.

12. The label switching device of claim 8, further comprising a forwarding table associated with the outgoing interface.

13. The label switching device of claim 12, wherein the packet processing logic further comprises label switched path setup logic operably coupled to add a forwarding table entry to the forwarding table, the forwarding table entry mapping the new label to a forwarding equivalence class and the outgoing interface for the label switched path.

14. The label switching device of claim 8, wherein the packet processing logic is operably coupled to forward unlabeled packets to the second label switching device over the outgoing interface upon deciding to stop using the label switched path.

15. The label switching device of claim 14, wherein the packet processing logic is operably coupled to remove a forwarding table entry from a forwarding table associated with the outgoing interface, the forwarding table entry mapping the new label to a forwarding equivalence class and the outgoing interface for the label switched path.

16. A program product for use in a first multi-protocol label switching ("MPLS") device, the program product comprising:
   packet processing logic coupled to:
      receive an unlabelled packet,
      allocate a new MPLS label to the packet, thereby creating a labeled packet,
      set an indicator that the packet is newly labeled, and
      transmit the labeled packet to a second, downstream label switching device over an outgoing interface without first explicitly establishing the new label switched path to the second label switching device using a signaling protocol,
   whereby the labeled packet itself establishes the label switched path at the downstream label switching device.

17. The program product of claim 16, wherein the packet processing logic further comprises label switched path setup logic programmed to add a forwarding table entry to a forwarding table, the forwarding table entry mapping the new label to a forwarding equivalence class and the outgoing interface for the label switched path.

18. The program product label switching device of claim 16, wherein the packet processing logic comprises:
label switching logic programmed to decide to establish the new label switched path;
label allocation logic programmed to allocate the new label for the new label switched path; and
packet labeling logic programmed to insert the new label in the packet and set the indicator in the packet to indicate that the packet is labeled.

19. The program product of claim 18, wherein the indicate is an ether-type field of the packet, and wherein the packet labeling logic is programmed to set the ethertype field to a predetermined value to indicate that the packet is labeled.

20. The program product of claim 18, wherein the indicator is a bit in a header field of the packet, and wherein the packet labeling logic is programming to set the bit to a predetermined value to indicate that the packet is labeled.

21. The program product of claim 16, wherein the packet processing logic is programmed to forward unlabeled packets to the second label switching device over the outgoing interface upon deciding to stop using the label switched path.

22. The program product of claim 21, wherein the packet processing logic is operably coupled to remove a forwarding table entry from a forwarding table associated with the outgoing interface, the forwarding table entry mapping the new label to a forwarding equivalence class and the outgoing interface for the label switched path.

23. A method for establishing a multi-protocol label switched ("MPLS") path to a first label switching device in a communication network without using an explicit signaling protocol, the method comprising:
receiving a labeled data packet including a new MPLS label and an indicator bit set to indicate that the labeled packet is newly labeled from a second, upstream label switching device; and
setting up the label switched path using the new label.

24. The method of claim 23, wherein the indicator is an ethertype field of the packet, and wherein the ethertype field is set to a predetermined value to indicate that the packet is labeled.

25. The method of claim 24, further comprising:
forwarding the packet based upon the network layer addressing information in the packet.

26. The method of claim 23, wherein setting up the label switched path using the new label comprises:
determining a forwarding equivalence class and outgoing interface for the packet based upon network layer addressing information in the packet; and
adding a forwarding table entry to a forwarding table, the forwarding table entry mapping the new label to the forwarding equivalence class and outgoing interface for the packet.

27. The method of claim 23, wherein the indicator is a bit in a header field of the packet, and wherein the bit is set to a predetermined value to indicate that the packet is labeled.

28. A multi-protocol label switching ("MPLS") device comprising:
an incoming interface providing an interface for communicating with a second, upstream label switching device; and
packet processing logic operably coupled to receive a newly labeled data packet including new MPLS label and an bit indicator for indicating that the labeled packet is newly labeled, from the second label switching device over the incoming interface without first explicitly establishing the label switched path from the second label switching device to the first label switching device using a signaling protocol and to set up the label switched path using the new label.

29. The label switching device of claim 28, wherein the packet processing logic comprises:
label detection logic operably coupled to determine that the received packet is labeled;
label switching logic responsive to the label detection logic and operably coupled to determine that the labeled packet is not associated with an existing label switched path; and
label switched path setup logic responsive to the label switching logic and operably coupled to set up the label switched path using the new label.

30. The label switching device of claim 29, further comprising:
routing logic responsive to the label switched path setup logic and operably coupled to forward the packet based upon the network layer addressing information in the packet.

31. The label switching device of claim 29, wherein the label switched path setup logic is operably coupled to determine a forwarding equivalence class and outgoing interface for the packet based upon network layer addressing information in the packet and add a forwarding table entry to a forwarding table, the forwarding table entry mapping the new label to the forwarding equivalence class and outgoing interface for the packet.

32. The label switching device of claim 29, wherein the labeled packet includes the new label and the indicator indicating that the packet is labeled, and wherein the label detection logic is operably coupled to determine that the received packet is labeled based upon the indicator.

33. The label switching device of claim 32, wherein the indicator is an ethertype field of the packet, and wherein the ethertype field is set to a predetermined value to indicate that the packet is labeled.

34. The label switching device of claim 32, wherein the indicator is a bit in a header field of the packet, and wherein the bit is set to a predetermined value to indicate that the packet is labeled.

35. A program product for use in a first multi-protocol label switching ("MPLS") device, the program product comprising packet processing logic programmed to receive a newly labeled data packet including a new MPLS label and an indicator for indicating that the labeled packet is newly labeled, from a second, upstream label switching device over an incoming interface without first explicitly establishing the label switched path from the second label switching device to the first label switching device using a signaling protocol and to set up the label switched path using the new label.

36. The program product of claim 35, wherein the packet processing logic comprises:
label detection logic programmed to determine that the received packet is labeled;
label switching logic responsive to the label detection logic and programmed to determine that the labeled packet is not associated with an existing label switched path;

label switched path setup logic responsive to the label switching logic and programmed to set up the label switched path using the new label.

37. The program product of claim 36, further comprising: routing logic responsive to the label switched path setup logic and programmed to forward the packet based upon the network layer addressing information in the packet.

38. The program product of claim 36, wherein the label switched path setup logic is programmed to determine a forwarding equivalence class and outgoing interface for the packet based upon network layer addressing information in the packet and to add a forwarding table entry to a forwarding table, the forwarding table entry mapping the new label to the forwarding equivalence class and outgoing interface for the packet.

39. The program product of claim 38, wherein the labeled packet includes the new label and the indicator indicating that the packet is labeled, and wherein the label detection logic is programmed to determine that the received packet is labeled based upon the indicator.

40. The program product of claim 39, wherein the indicator is an ethertype field of the packet, and wherein the ethertype field is set to a predetermined value to indicate that the packet is labeled.

41. The program product of claim 39, wherein the indicator is a bit in a header field of the packet, and wherein the bit is set to a predetermined value to indicate that the packet is labeled.

42. A communication system comprising a first multi-protocol label switching ("MPLS") device in communication with a second label switching device over a communication network, wherein the first label switching device and the second label switching device use a data packet-driven mechanism to establish a label switched path from the first label switching device to the second label switching device without first explicitly establishing the label switched path using a signaling protocol packet, and wherein the first label switching device is operably coupled to allocate a new MPLS label for the label switched path and to forward a labeled packet including the new label and an indicator for indicating that the labeled packet is newly labeled, to the second label switching device over the communication network upon deciding to establish a new label switched path to the second label switching device.

43. The communication system of claim 42, wherein the second label switching device is operably coupled to receive the labeled packet from the first label switching device and to set up the new label switched path using the new label from the labeled packet.

44. The communication system of claim 43, wherein the first label switching device is operably coupled to forward unlabeled packets to the second label switching device upon deciding to remove the label switched path, and wherein the second label switching device is operably coupled to remove the label switched path.

45. A method for label allocation by an upstream device comprising the step of:
receiving an unlabelled communication message; and
generating from the unlabelled communication messages a communication message including a new multi-protocol label switching label for a label switched path to be established and a label indicator indicating that the protocol message is labeled.

46. The method of claim 45, wherein the label indicator comprises an ethertype field having a predetermined value for indicating that the protocol message is labeled.

47. The method of claim 45, wherein the label indicator comprises a bit in a header field.

* * * * *